United States Patent [19]
Sik

[11] Patent Number: 5,887,775
[45] Date of Patent: Mar. 30, 1999

[54] CUP HOLDER OF AN ELECTRIC MOTION TYPE FOR A VEHICLE

[75] Inventor: Han Wan Sik, Ulsan, Rep. of Korea

[73] Assignee: Hyundai Motor Company, Seoul, Rep. of Korea

[21] Appl. No.: 948,571

[22] Filed: Oct. 10, 1997

[30] Foreign Application Priority Data

Oct. 11, 1996 [KR] Rep. of Korea .................. 1996 45375

[51] Int. Cl.⁶ ........................................................ B60N 3/10
[52] U.S. Cl. ........................ 224/552; 224/553; 224/926; 250/61.59
[58] Field of Search ..................................... 224/281, 282, 224/926, 553, 552, 548; 248/311.2; 296/37.12, 37.8; 297/188.14, 188.17; 200/61.59

[56] References Cited

U.S. PATENT DOCUMENTS 5,601,269  2/1997  Jankovic ................................. 224/281

*Primary Examiner*—Linda J. Sholl
*Attorney, Agent, or Firm*—Christie, Parker & Hale, LLP

[57] ABSTRACT

An electronically operated cup holder includes a cup propping plate and at least one movable cup supporter mounted over the cup propping plate opposite a corresponding cup supporting face. The weight of a cup placed on the cup propping plate activates a motor which drives the at least one movable cup supporter toward a circumferential surface of the cup.

15 Claims, 2 Drawing Sheets

CUP HOLDER OF AN ELECTRIC MOTION TYPE FOR A VEHICLE

FIELD OF THE INVENTION

The present invention relates generally to an electrically operated cup holder for a vehicle, and more particularly, to a electrically operated cup holder activated when a cup is put on the cup holder to hold the cup in a stable state by a cup supporter that is moved toward a circumferential surface of the cup.

BACKGROUND OF THE INVENTION

In present-day life, the use of automobiles is increasing day by day, and these automobiles are being equipped with independent living devices beyond that required for movement in traffic means.

In this respect, convenience features of automobiles are emphasized, depending on one's daily life as well as technical matters, like driving stability and good drive feeling. Generally, the convenience features of an automobile include a cigarette lighter, an ash tray, a cup holder for holding a cup or can, etc. Additionally, depending on a driver's interest, other convenience features can be optionally installed.

A cup holder for an automobile is installed in a center facia panel mounting audio equipment for use by a driver or passenger. A cup or can must be held regardless of its size, and the holding state must be stabilized. "Cup" is hereafter used to generally refer to a cup, can, glass or other similar container.

SUMMARY OF THE INVENTION

The present invention is made in an effort to solve the above described objectives of a cup holder for an automobile.

An electrically operated cup holder is provided having a cup propping plate. At least one movable cup supporter is mounted over the cup propping plate, opposite a corresponding cup supporting face. Additionally, electrically operated means activated by the weight of a cup placed on the cup propping plate are provided for driving the at least one movable cup supporter toward a circumferential surface of the cup.

One specific embodiment of the invention is a cup supporter, designed to support one side of a rounded face of a cup, and is mounted, along with a small electric motor having a screw-shaft, in the back of the cup holder's rear plate. When a user puts a cup on the cup holder, the small electric motor is activated by the cup's dead weight, activating a transmitting means operated by the motor. The cup supporter is moved toward a circumferential surface of the cup by the transmitting means.

It is an objective of one embodiment of the present invention to provide a cup holder of an electric motion type for a vehicle, wherein a cup can be held by the above cup supporter, which is moved close to the circumferential surface of the cup.

To achieve the above objective, the present invention provides an electrically operated cup holder for a vehicle including a cup propping plate having a cup supporting face, and a cup supporter, which is operated by the transmitting means, and is mounted opposite a cup supporting face having a semi-circular shape. The cup holder also includes a driving means which operates the transmitting means, and a power source means, for driving the driving means, which is earthed or grounded in response to the cup's dead weight.

The driving and transmitting means include a small motor rotating a screw shaft and a slider which is moved along the screw shaft and in turn moves a lever. One end of the lever is linked to a side of the slider, and the other end is linked to a cup supporter.

The power source means, which drives the driving means, includes a circular contact plate surrounding a contact pin which is moved longitudinally. Accordingly, the contact pin is inserted into a hole formed in both the cup propping plate and the lower plate of the cup holder. A spring is placed between an earthing plate and the contact plate, and the earthing plate is attached to the lower plate of the cup holder so as to contact the contact plate.

BRIEF DESCRIPTION OF THE DRAWINGS

The accompanying drawing, which are incorporated in and constitute a part of the specification, illustrate an embodiment of the invention and together with the description, serve to explain the principles of the invention.

DETAILED DESCRIPTION OF THE INVENTION

Reference will now be made in more detail to a presently preferred embodiment of the invention, an example of which is illustrated in the accompanying drawings. The presently preferred embodiment is designed to support up to two cups on each cup holder.

Figure 1:
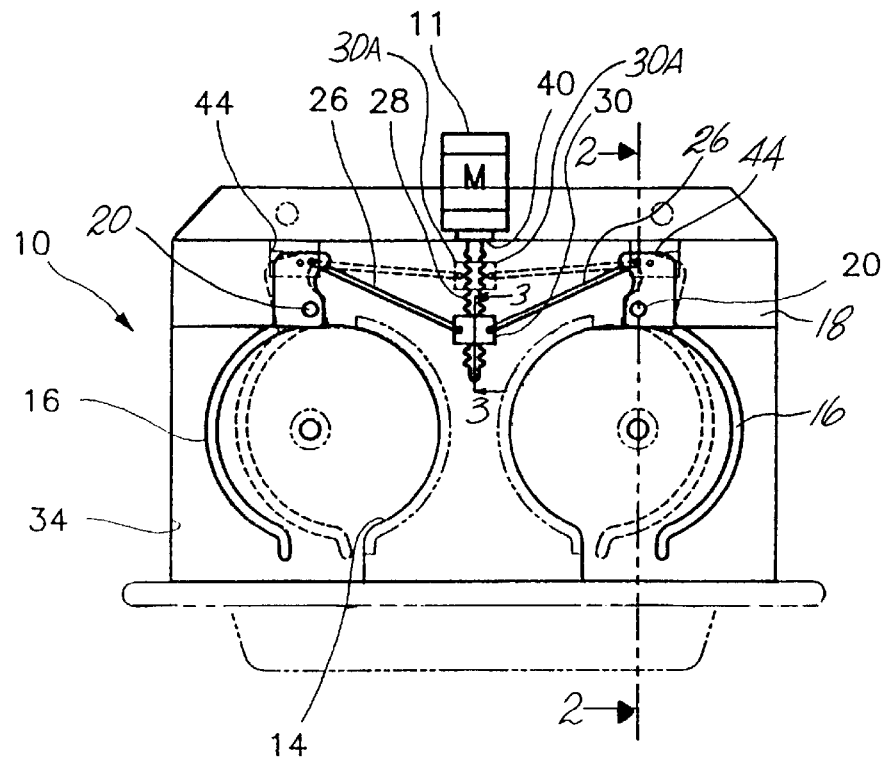
FIG. 1 is a schematic top plan view of a cup holder of an electric motion type for a vehicle according to the present invention.
Figure 2:
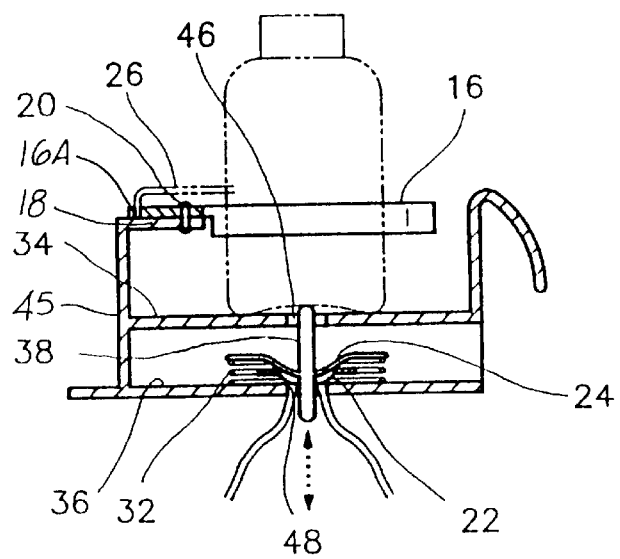
FIG. 2 is a cross-sectional view along the lines 2—2 of FIG. 1.
Figure 3:
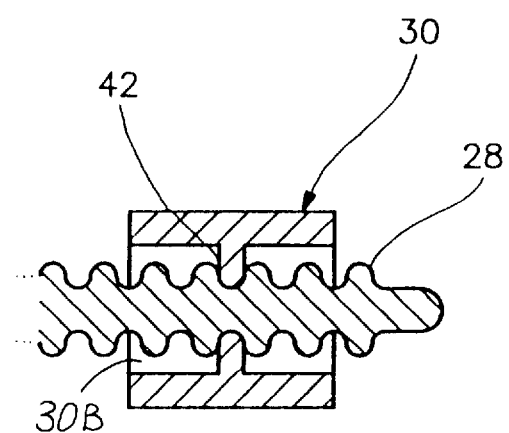
FIG. 3 is a cross-sectional view along the lines 3—3 of FIG. 1, and shows an inner structure of slider of the present invention.

FIG. 1 is a top view of an electrically operated cup holder 10 for a vehicle according to the present invention.

Two semi-circular cup supporting faces 14 are formed in an upper plate 18 of the cup holder, which has two hinge-holes 20, one in each side of a rear end of the upper plate. Behind the hinge-holes, are a pair of right-angled holes 44 formed in rear plate 45.

A cup propping plate 34 having a circular hole 46 for each cup is formed under the upper plate 18. Under the cup propping plate 34, is a square lower plate 36. In the lower plate 36, a separate hole 48 for earthing or grounding is formed to coincide with each hole 46 in the cup propping plate 34. Accordingly, the rear plate 45 is formed in a common body with the rear end of the upper plate 18, the cup propping plate 34, and the lower plate 36. Additionally a circular hole 40 is formed in a center of the rear plate 45.

A pair of semi-circular movable cup supporters 16 are each hinged about pivot 20 in a separate hinge-hole of the upper plate 18. A small electric motor 11 having screw shaft 28 with saw-teeth is mounted on the back of the rear plate 45. The screw shaft 28 of the motor 11 is inserted in the hole 40 of the rear plate 45 and is located above the cup propping plate 34, and the screw shaft 28 is inserted in a slider 30.

The upper part of the slider 30 is a square plate having two holes 30A, and the lower part of the slider comprises a hollow cylinder 30B. Around the circumference of the inside of the hollow cylinder 30B, there is an engaging fence 42 along the above circumference that is capable of gearing with the saw-teeth of the screw shaft 28.

One end of each of a pair of thin, elongated levers 26 is bent and is inserted in a respective one of the holes 30A of the slider 30, and the other end of each of the levers is inserted in a rear end 16A of a corresponding cup supporter 16, which is hinged with respect to the upper plate 18.

A pair of elongated contact pins 38 is provided and each is inserted in a different one of holes 46 of a cup propping plate 34. The contact pins 38 are inserted in a pair of contact plates 24 located above the lower plate 36. Each contact plate is adhered to a lower end of a different one of the contact pins 38.

Circular earthing holes 48 are formed through both faces of the lower plate 36, and an a pair of earthing plates 22 each having a hole in its center is located one over each of the holes 48. Consequently, the hole of each earthing plate 22 coincides with a hole 48 of the lower plate 36. A separate spring 32 is inserted between each earthing plate 22 and each contact plate 24.

Therefore, the dead weight of a cup put on a corresponding cup propping plate 34 presses a corresponding contact pin 38 which projects somewhat through the corresponding hole 46 of the corresponding cup propping plate 34. The contact plate 24, which is adhered to the contact pin 38 electrically contacts an earthing plate 22, and the lower end of the contact pin is inserted in an earthing hole 22 of an earthing plate 22. Accordingly, the contact plate 24 and the earthing plate 22 are earthed, and the current of a battery (not shown) which can drive the motor 11 is transmitted to the motor 11.

By the driving of the motor 11, the screw shaft 28 of the motor 11 is rotated, and then, the slider 30, which is inserted on the screw shaft 28, is reciprocated along the screw shaft. The cup supporters 16 are pulled or pushed by the levers 26 which are linked to the slider 30, and thus, the cup supporter 16 is moved toward the circumferential surface of the cup. Therefore, the cup is held by the moveable cup supporter 16.

As described in the above, an electronically operated cup holder for a vehicle according to the present invention has recognized advantages in that, regardless of a diameter of a cup, when the cup is placed on a cup propping plate of the cup holder, a movable cup supporter is activated by a driven motor, and thus, the cup is held by the movable cup supporter, providing drivers and passengers with convenience.

What is claimed is:

1. A cup holder of an electric motion type for a vehicle, capable of holding two cups, the cup holder comprising:
   a cup propping plate having a pair of cup supporting faces;
   a pair of semi-circular cup supporters, each mounted on an opposite side of a different one of the cup supporting faces;
   means for transmitting the cup supporters toward a circumferential surface of a cup placed on the cup propping plate;
   means for driving the transmitting means; and
   means for providing power to the driving means, responsive to the cup's dead weight.

2. A cup holder-of an electric motion type according to claim 1, wherein said driving means comprises a small electric motor having screw shaft, and a slider which can be moved along the screw shaft, and wherein said transmitting means comprises two elongated levers, one end of each said levers linked to a side of the slider and the other end of each said levers linked to a different one of the cup supporters.

3. A cup holder of an electric motion type according to claim 1 or 2 wherein said means for providing power comprises, for each cup supporter, a contact plate coupled to a contact pin, which can be moved longitudinally, the contact pin being inserted into a hole formed in the cup propping plate, and a spring between an earthing plate and the contact plate, the earthing plate being attached to the cup holder so as to contact the contact plate.

4. A cup holder of an electric motion type according to claim 2 wherein said small electric motor is mounted to a back of a rear plate which is formed in a body with the cup propping plate, and wherein a hole is formed substantially at the center of the back of the rear plate for inserting the screw shaft.

5. A cup holder of an electric motion type according to claim 4 wherein an upper part of the slider, which is reciprocated along the screw shaft of the small electric motor, comprises a square plate, and a lower part of the slider comprises a hollow cylinder, the inside of the hollow cylinder having a fence engaging saw-teeth on the screw shaft.

6. An electrically operated cup holder comprising:
   a cup propping plate;
   at least one movable cup supporter mounted over the cup propping plate, the at least one movable cup supporter being mounted opposite a corresponding cup supporting face; and
   electrically operated means activated by the weight of a cup placed on the cup propping plate for driving the at least one movable cup supporter toward a circumferential surface of the cup.

7. The cup holder according to claim 6, wherein the at least one movable cup supporter comprises two cup supporters, each cup supporter mounted opposite a corresponding cup supporting face.

8. The cup holder according to claim 7 wherein the electrically operated means comprises an electric motor coupled to a screw shaft, a slider reciprocatingly moved by the screw shaft, and a pair of levers, wherein one end of each said levers is attached to a respective side of the slider, and another end of each lever is attached to a different one of the cup supporters.

9. The cup holder according to claim 8 wherein the electrically operated means further comprises, for each cup supporter, a contact plate having a contact pin extending through the contact plate, an earthing plate having a hole corresponding to the hole of the contact plate, and a spring positioned between the earthing plate and the contact plate, wherein the contact pin extends through a hole in the cup propping plate so that the weight of a cup placed on the cup propping plate moves the pin, causing the contact plate to be moved into contact with the earthing plate.

10. The cup holder according to claim 9 wherein the electric motor is mounted on a rear plate of the cup holder, and wherein the rear plate comprises a hole through which the screw shaft is inserted.

11. The cup holder according to claim 10 wherein the screw shaft comprises teeth, and wherein a lower section of the slider comprises a hollow cylinder having therein a fence for engaging the teeth of the screw shaft.

12. The cup holder according to claim 6 wherein the electrically operated means comprises an electrically operated motor.

13. The cup holder according to claim 6 wherein the electrically operated means comprises electric contacts operated by the weight of the cup when placed on the cup propping plate.

14. The cup holder according to claim 6 wherein the at least one movable cup supporter comprises a single cup supporter mounted opposite a cup supporting face.

15. The cup holder according to claim 14 wherein the electrically operated means comprises an electric motor coupled to a screw shaft, a slider reciprocatingly moved by the screw shaft, and a lever, one end of the lever attached to a side of the slider and another end of the lever attached to the cup supporter.

* * * * *